(12) United States Patent
Cheng et al.

(10) Patent No.: US 10,018,797 B2
(45) Date of Patent: Jul. 10, 2018

(54) CABLE PULLING ASSEMBLY HAVING A CABLE CONNECTOR AND A PULLING DEVICE

(71) Applicant: ADC Telecommunications (Shanghai) Distribution Co., Ltd., Shanghai (CN)

(72) Inventors: Xinjun Cheng, Shanghai (CN); Zhaoyang Tong, Shanghai (CN); Lei Liu, Shanghai (CN); Longzhou Qi, Shanghai (CN)

(73) Assignee: ADC TELECOMMUNICATIONS (SHANGHAI) DISTRIBUTION CO., LTD. (CN)

( * ) Notice: Subject to any disclaimer, the term of this patent is extended or adjusted under 35 U.S.C. 154(b) by 0 days.

(21) Appl. No.: 15/115,582

(22) PCT Filed: Jan. 15, 2015

(86) PCT No.: PCT/IB2015/050299
§ 371 (c)(1),
(2) Date: Jul. 29, 2016

(87) PCT Pub. No.: WO2015/114480
PCT Pub. Date: Aug. 6, 2015

(65) Prior Publication Data
US 2017/0068064 A1 Mar. 9, 2017

(30) Foreign Application Priority Data
Jan. 29, 2014 (CN) .......................... 2014 1 0043292

(51) Int. Cl.
*G02B 6/44* (2006.01)
*G02B 6/38* (2006.01)

(52) U.S. Cl.
CPC ......... *G02B 6/4465* (2013.01); *G02B 6/3831* (2013.01); *G02B 6/3849* (2013.01); *G02B 6/3887* (2013.01); *G02B 6/3821* (2013.01)

(58) Field of Classification Search
CPC .. G02B 6/3821; G02B 6/3849; G02B 6/3887; G02B 6/3831; G02B 6/4465
(Continued)

(56) References Cited

U.S. PATENT DOCUMENTS

| 4,635,875 A | * | 1/1987 | Apple | ..................... B66D 1/36 |
| | | | | 242/155 BW |
| 4,691,988 A | * | 9/1987 | Tremblay | ................ F16G 11/00 |
| | | | | 174/79 |

(Continued)

FOREIGN PATENT DOCUMENTS

| CN | 1333471 A | 1/2002 |
| CN | 101641627 A | 2/2010 |

(Continued)

OTHER PUBLICATIONS

International Search Report for PCT/IB2015/050299 dated Jun. 9, 2015 (3 pages).

*Primary Examiner* — Akm Enayet Ullah
(74) *Attorney, Agent, or Firm* — Merchant & Gould, P.C.

(57) ABSTRACT

The present invention discloses a cable pulling assembly, comprising: a connector connected to an end of a cable; and a pulling device connected to a housing of the connector, wherein a first engagement portion is formed on an inner wall of the pulling device, a second engagement portion, adapted to be engaged with the first engagement portion, is formed on an outer wall of the housing of the connector, and when the pulling device is sleeved on the housing of the connector and when the first and second engagement portions are engaged with each other, the pulling device is connected to the housing of the connector. The pulling (Continued)

device can be simply and quickly assembled to and disassembled from the housing of the connector in the field.

16 Claims, 7 Drawing Sheets

(58) Field of Classification Search
USPC .................................. 385/100, 135–139, 147
See application file for complete search history.

(56) References Cited

U.S. PATENT DOCUMENTS

| | | | | |
|---|---|---|---|---|
| 5,471,713 | A * | 12/1995 | Alter | A43C 7/00 24/136 R |
| 5,619,610 | A | 4/1997 | King et al. | |
| 5,637,010 | A * | 6/1997 | Jost | H01R 13/6277 439/352 |
| 5,897,393 | A * | 4/1999 | Haftmann | H01R 12/79 439/328 |
| 6,325,547 | B1 | 12/2001 | Cammons et al. | |
| 6,902,140 | B1 * | 6/2005 | Huang | E06C 7/44 248/188.2 |
| 8,443,488 | B2 * | 5/2013 | Zhang | E05F 3/221 16/65 |
| 8,647,140 | B2 * | 2/2014 | Annecke | H01R 13/6273 439/352 |
| 8,821,180 | B2 * | 9/2014 | Blakborn | H01R 13/6277 439/357 |
| 2003/0215191 | A1 | 11/2003 | Taira et al. | |
| 2008/0273855 | A1 | 11/2008 | Bradley et al. | |

FOREIGN PATENT DOCUMENTS

| | | |
|---|---|---|
| CN | 102360104 A | 2/2012 |
| CN | 102460259 A | 5/2012 |
| CN | 203054267 U | 7/2013 |
| EP | 2482109 A2 | 8/2012 |

* cited by examiner

CABLE PULLING ASSEMBLY HAVING A CABLE CONNECTOR AND A PULLING DEVICE

CROSS-REFERENCE TO RELATED APPLICATION

This application claims the benefit of Chinese Patent Application No. 201410043292.7 filed on Jan. 29, 2014 in the State Intellectual Property Office of China, the whole disclosure of which is incorporated herein by reference.

BACKGROUND OF THE INVENTION

Field of the Invention

The present invention relates to a cable pulling assembly, a method of assembling the cable pulling assembly, and a method of disassembling the cable pulling assembly.

Description of the Related Art

In prior art, when it needs to pull a fiber optic connector through an elongated pipe, there are generally two solutions. In the first solution, a pulling device is sleeved on a housing of the connector, and a rope is tied on the pulling device, the connector is pulled through the elongated pipe by pulling the rope. In the second solution, a rope is directly tied on the housing of the connector, and the connector is pulled through the elongated pipe by pulling the rope.

As for the first solution, a special tool must be used to assemble the pulling device on the connector. Thereby, the pulling device is generally assembled on the fiber optic connector in factory and sold together with the fiber optic connector. Furthermore, after the fiber optic connector is pulled through the elongated pipe, the special tool must be used again to disassemble the pulling device from the connector. Thereby, the first solution in the prior art is inconvenient and complicated.

As for the second solution, although it is very simple, a ferrule assembly of the fiber optic connector is directly exposed in the elongated pipe, and the ferrule assembly may be scratched by the pipe wall or contaminated by dirt in the pipe, decreasing the optical performance of the fiber optic connector.

SUMMARY OF THE INVENTION

The present invention has been made to overcome or alleviate at least one aspect of the above mentioned disadvantages.

According to an object of the present invention, there is provided a cable pulling assembly comprising a pulling device capable of easily assembled on a connector in the field and simply disassembled from the connector in the field.

According to an aspect of the present invention, there is provided a cable pulling assembly, comprising: a connector connected to an end of a cable; and a pulling device connected to a housing of the connector, wherein a first engagement portion is formed on an inner wall of the pulling device, a second engagement portion, adapted to be engaged with the first engagement portion, is formed on an outer wall of the housing of the connector, and when the pulling device is sleeved on the housing of the connector and when the first and second engagement portions are engaged with each other, the pulling device is connected to the housing of the connector.

According to an exemplary embodiment of the present invention, the first engagement portion is configured to be one of a protrusion and a recess, and the second engagement portion is configured to be the other of the protrusion and the recess.

According to another exemplary embodiment of the present invention, the first engagement portion is configured to be a protrusion formed on the inner wall of the pulling device, and the second engagement portion is configured to be a recess formed in the outer wall of the housing of the connector.

According to another exemplary embodiment of the present invention, a spring is received in the housing of the connector, and when the pulling device is connected to the housing of the connector, the spring exerts an axial pushing force on the pulling device, so as to hold the protrusion in the recess.

According to another exemplary embodiment of the present invention, when the spring is compressed against the axial pushing force by the pulling device, the protrusion is disengaged from the recess, so that the pulling device is capable of being disassembled from the housing of the connector.

According to another exemplary embodiment of the present invention, one end of the pulling device is formed as an opened end with an opening through which the connector is inserted, and the other end of the pulling device is formed as a sealed end; a seal ring is mounted on the housing of the connector; and when the pulling device is connected to the housing of the connector, an edge of the opening of the pulling device compresses against the seal ring to seal an interface between the pulling device and the connector.

According to another exemplary embodiment of the present invention, the connector is a fiber optic connector, and the spring is configured to exert an axial elastic force on a ferrule assembly in the fiber optic connector.

According to another exemplary embodiment of the present invention, a dust cap is mounted on a front end of a ferrule of the ferrule assembly, and when the pulling device is connected to the housing of the connector, the dust cap is directly pushed on the inner wall of the sealed end of the pulling device under an action of the spring.

According to another exemplary embodiment of the present invention, a protruding flange, adapted to be engaged with a groove formed in a fiber optic adapter, is formed on the outer wall of the housing of the fiber optic connector; a notch is formed in the protruding flange, so as to allow the protrusion of the pulling device to pass therethrough; and the recess is formed in one side of the protruding flange opposite to a front end of the connector.

According to another exemplary embodiment of the present invention, a plurality of notches are formed in the protruding flange, and a plurality of recesses are formed in the protruding flange; and the notches and the recesses are alternately arranged and spaced from each other by a predetermined angle on the outer circumferential wall of the housing of the connector.

According to another exemplary embodiment of the present invention, a pair of notches are formed in the protruding flange, and a pair of recesses are formed in the protruding flange; and the notches and the recesses are alternately arranged and spaced from each other by an angle of 90 degrees on the outer circumferential wall of the housing of the connector.

According to another exemplary embodiment of the present invention, the pulling device is configured to be an integral piece.

According to another exemplary embodiment of the present invention, the pulling device comprises: a first body, on an inner wall of which the protrusion is formed; and a second body removably connected to the first body and formed with a first connection ear portion.

According to another exemplary embodiment of the present invention, an elongated pulling element is adapted to be directly tied on the first connection ear portion.

According to another exemplary embodiment of the present invention, the pulling device further comprises: a connection member having a second connection ear portion at one end thereof and a ball head portion at the other end thereof; and a rotation sleeve having a ball socket at one end thereof and a connection portion for connecting an elongated pulling element at the other end thereof, wherein the second connection ear portion of the connection member is connected to the first connection ear portion of the second body, and wherein the ball head portion of the connection member is rotatably engaged in the socket portion of the rotation sleeve, so that the rotation sleeve is rotatable about an axis of the connector and movable from the axis of the connector with respect to the second body.

According to another exemplary embodiment of the present invention, the pulling device comprises: a first body, on an inner wall of which the protrusion is formed; a second body, one end of which is removably connected to the first body, and the other end of which is formed with a threaded hole; a connection member, one end of which is formed with a threaded post, and the other end of which is formed with a ball head portion; and a rotation sleeve, one end of which is formed with a socket portion, and the other end of which is adapted be connected to an elongated pulling element, wherein the threaded post of the connection member is screwed into the threaded hole of the second body, and wherein the ball head portion of the connection member is rotatably engaged in the socket portion of the rotation sleeve, so that the rotation sleeve is rotatable about an axis of the connector and movable from the axis of the connector with respect to the second body.

According to another exemplary embodiment of the present invention, the elongated pulling element is crimped on the other end of the rotation sleeve.

According to an aspect of the present invention, there is provided a method of assembling the above cable pulling assembly, comprising step of:

S100: inserting the connector into the pulling device, and engaging the first engagement portion of the pulling device with the second engagement portion of the connector housing.

According to an aspect of the present invention, there is provided a method of assembling the above cable pulling assembly, comprising steps of:

S110: aligning the protrusion on the pulling device with the notch in the housing of the connector, and inserting the connector into the pulling device; and S210: rotating the pulling device by the predetermined angle with respect to the connector housing, so that the protrusion on the pulling device is aligned with and engaged in the recess in the connector housing.

According to an aspect of the present invention, there is provided a method of disassembling the above cable pulling assembly, comprising steps of:

S210: moving the pulling device to compress the spring, so that the protrusion on the pulling device is disengaged from the recess in the connector housing; and S220: rotating the pulling device by the predetermined angle with respect to the connector housing, so that the protrusion on the pulling device is aligned with the notch in the connector housing, and pulling the connector out of the pulling device.

In the above exemplary embodiments of the present invention, the pulling device can be simply and quickly assembled to and disassembled from the housing of the connector in the field.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a cable pulling assembly, comprising: a connector connected to an end of a cable; and a pulling device connected to a housing of the connector, wherein a first engagement portion is formed on an inner wall of the pulling device, a second engagement portion, adapted to be engaged with the first engagement portion, is formed on an outer wall of the housing of the connector, and when the pulling device is sleeved on the housing of the connector and when the first and second engagement portions are engaged with each other, the pulling device is connected to the housing of the connector.

Figure 1:
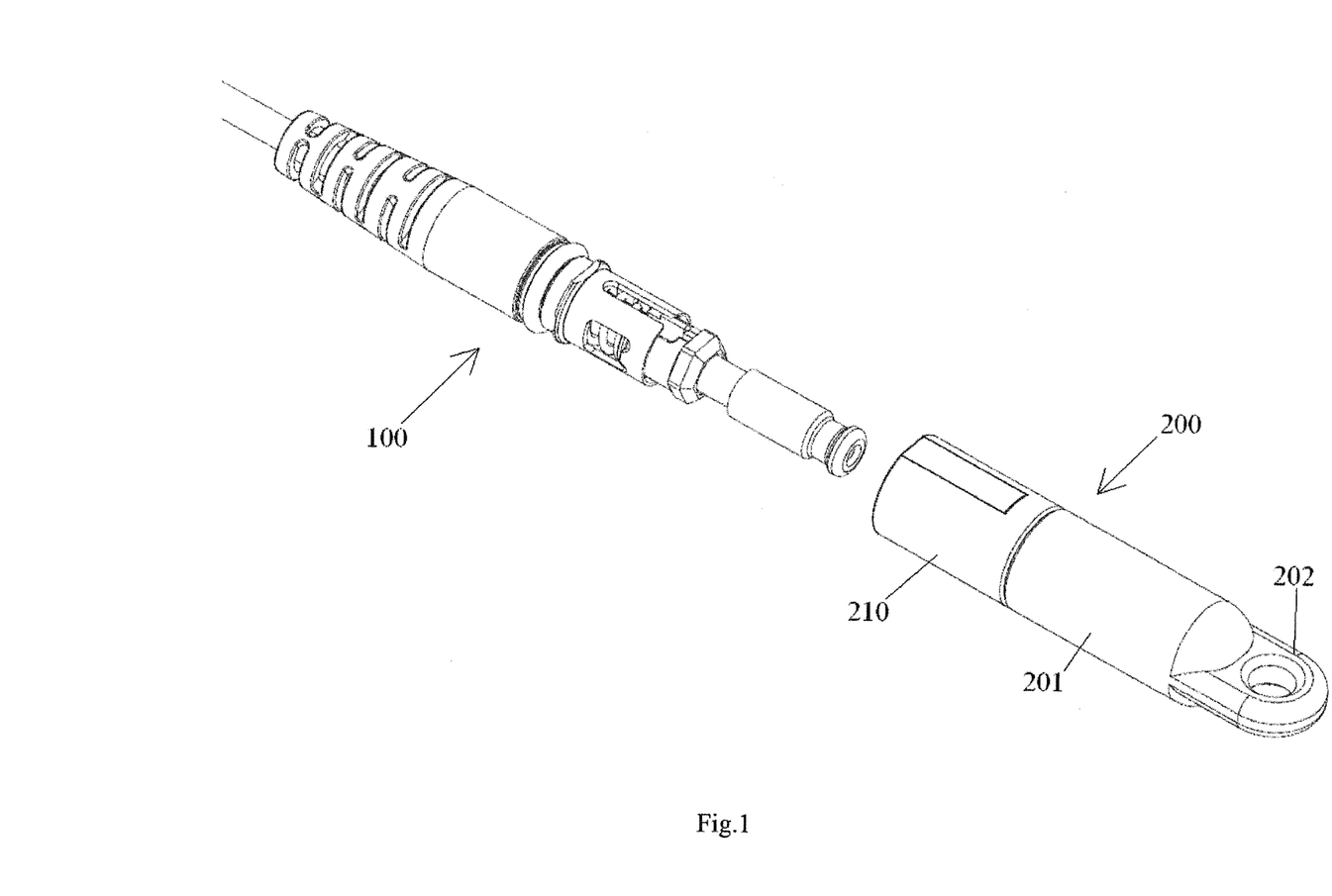
FIG. 1 is an illustrative perspective view of a cable pulling assembly according to a first exemplary embodiment of the present invention.

FIG. 1 is an illustrative perspective view of a cable pulling assembly according to a first exemplary embodiment of the present invention.

In an exemplary embodiment of the present invention, as shown in FIG. 1, the cable pulling assembly mainly comprises a connector 100 and a pulling device 200. The connector 100 is connected to an end of a cable 105, and the pulling device 200 is connected to a housing 110 of the connector 100.

In the illustrated embodiment of FIG. 1, the connector 100 is a fiber optic connector, but the present invention is not limited to this, the connector 100 may be a power cable connector.

Figure 2:
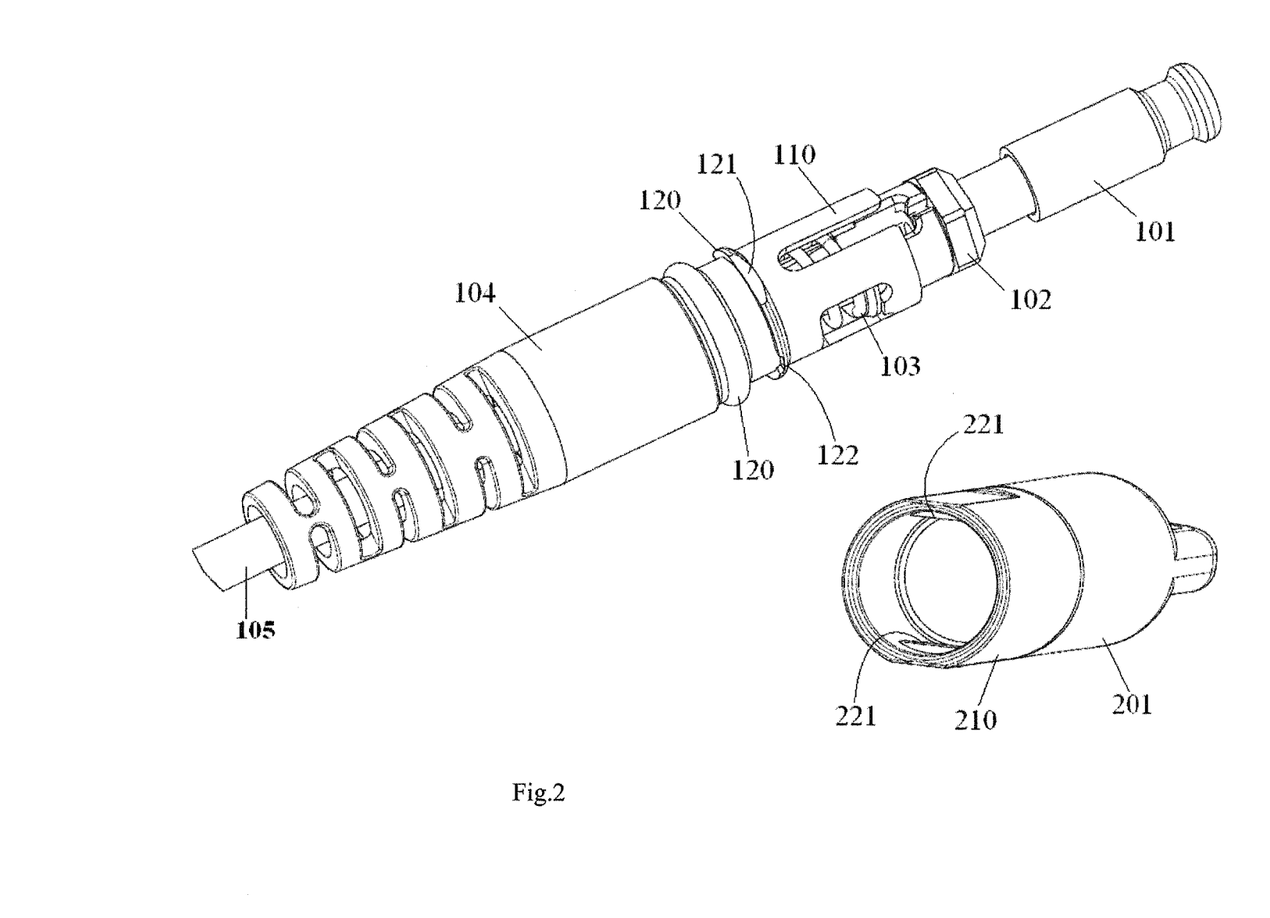
FIG. 2 is another illustrative perspective view of the cable pulling assembly of FIG. 1.
Figure 3:
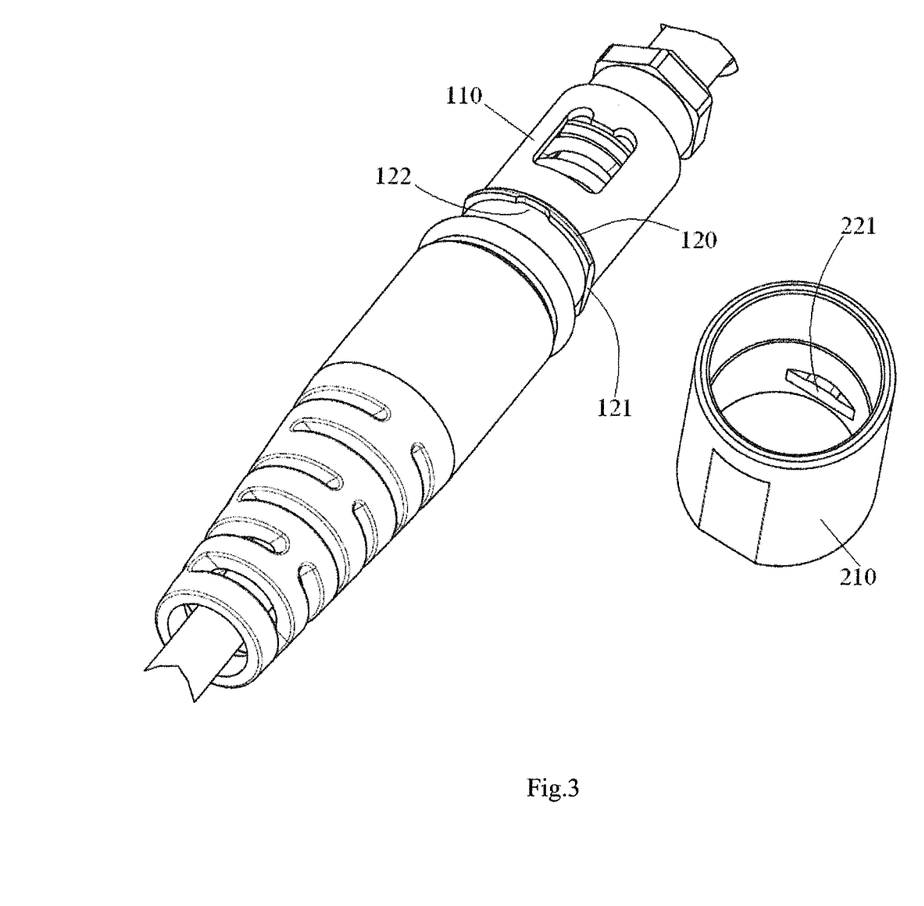
FIG. 3 is an illustrative local enlarged view of the cable pulling assembly of FIG. 1.
Figure 4:
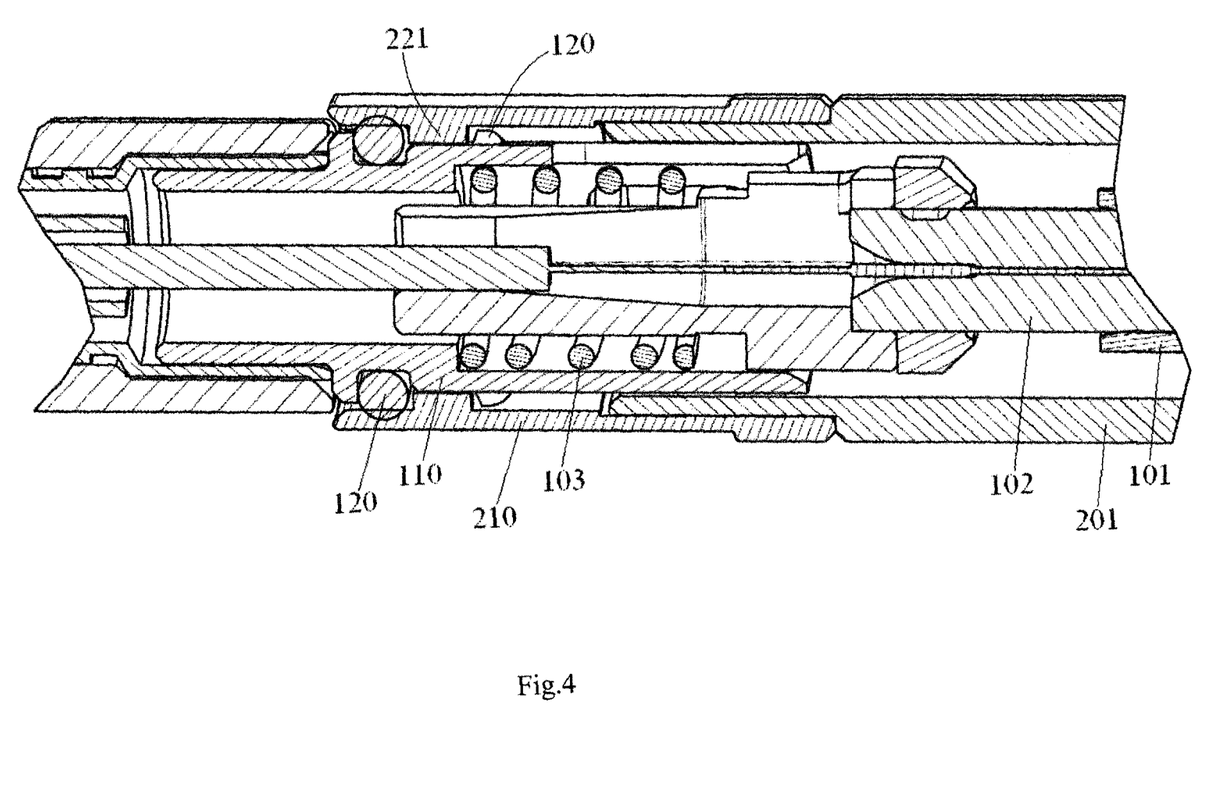
FIG. 4 is an illustrative cross section view of the cable pulling assembly after assembling the connector and the pulling device shown in FIG. 1 together.

FIG. 2 is another illustrative perspective view of the cable pulling assembly of FIG. 1; FIG. 3 is an illustrative local enlarged view of the cable pulling assembly of FIG. 1; FIG. 4 is an illustrative cross section view of the cable pulling assembly after assembling the connector 100 and the pulling device 200 shown in FIG. 1 together.

As shown in FIGS. 2-4, a protrusion 221 is formed on an inner wall of the pulling device 200, and a recess 122 is formed in an outer wall of the housing 110 of the connector 100. The protrusion 221 and the recess 122 are adapted to be engaged with each other. When the pulling device 200 is sleeved on the housing 110 of the connector 100 and when the protrusion 221 and the recess 122 are engaged with each other, the pulling device 200 is connected to the housing 110 of the connector 100.

Please be noted that the protrusion 221 and the recess 122 are not limited to the illustrated embodiment, the protrusion 221 and the recess 122 may have any suitable configuration and shape as long as the protrusion 221 and the recess 122 are capable of being engaged with each other. In the present invention, once the protrusion 221 is engaged in the recess 122, the pulling device 200 cannot be rotated and moved with respect to the connector housing 110 during pulling the connector 100 through a pipe by means of the pulling device 200.

In the illustrated embodiment, the protrusion 221 is formed on the inner wall of the pulling device 200, and the recess 122 is formed in the outer wall of the connector housing 110. But the present invention is not limited to this, in an alternative embodiment, the protrusion may be formed on the outer wall of the connector housing, and the recess may be formed on the inner wall of the pulling device.

As shown in FIGS. 2-4, a spring 103 is received in the housing 110 of the connector 100. The spring 103 is configured to exert an axial elastic force on a ferrule assembly 102 in the fiber optic connector 100. When the pulling device 200 is connected to the housing 110 of the connector 100, the spring 103 also exerts an axial pushing force on the pulling device 200, so as to hold the protrusion 221 in the recess 122 and prevent the protrusion 221 from being disengaged from the recess 122. In this way, the pulling device 200 is reliably engaged and locked to the housing 110 of the connector 100. Thereby, the pulling device 200 can be easily assembled to the housing 110 of the connector 100.

As shown in FIGS. 2-4, after the pulling device 200 is connected to the housing 110 of the connector 100, an engagement between the protrusion 221 and the recess 122 can be released simply by compressing the spring 103 against the axial pushing force with the pulling device 200, and then the pulling device 200 is capable of being disengaged from the housing 110 of the connector. In this way, the pulling device 200 can be easily disassembled from the housing 110 of the connector 100.

Referring to FIGS. 1-4, in an embodiment, one end of the pulling device 200 is formed with an opened end with an opening through which the connector 100 is inserted, and the other end of the pulling device 200 is formed with a sealed end. A first connection ear portion 202 is formed on the sealed end of the pulling device 200. A seal ring 120 is mounted on the housing 110 of the connector 100. When the pulling device 200 is connected to the housing 110 of the connector 100, as shown in FIG. 4, an edge of the opening of the pulling device 200 compresses against the seal ring 120, so as to seal an interface between the pulling device 200 and the connector 100. In this way, the ferrule assembly 102 and an optical fiber (not shown) of the connector 100 are sealed inside the pulling device 200, so that the ferrule assembly 102 and the optical fiber are protected from being scratched by the pipe wall or contaminated by dirt in the pipe during pulling the connector 100 through the pipe by means of the pulling device 200.

In an exemplary embodiment of the present invention, a dust cap 101 is mounted on a front end of a ferrule of the ferrule assembly 102. Once the pulling device 200 is connected to the housing 110 of the connector 100, the dust cap 101 is directly abutted against the inner wall of the sealed end of the pulling device 200 under the action of the spring 103. In this way, during mounting the pulling device 200 onto the housing 110 of the connector 100, the dust cap 101 can protect the front ends of the ferrule and the optical fiber from being damaged by the inner wall of the pulling device 200 or contaminated by dirt in the pulling device 200.

As shown in FIGS. 2-3, a protruding flange 120, adapted to be engaged with a groove formed in a fiber optic adapter (not shown), is formed on the outer wall of the housing 110 of the fiber optic connector 100. A notch 121 is formed in the protruding flange 120, so as to allow the protrusion 221 of the pulling device 200 to pass therethrough. The recess 122 is formed in one side of the protruding flange 120 opposite to a front end of the connector 100 to be inserted into the pulling device 200, that is, the recess 122 is formed in the side of the protruding flange 120 facing a stress relief shoe 104 mounted on a rear end of the connector 100.

In an exemplary embodiment of the present invention, a plurality of notches 121 are formed in the protruding flange 120, and a plurality of recesses 122 are formed in the protruding flange 120. The plurality of notches 121 and the plurality of recesses 122 are alternately arranged on the outer circumferential wall of the housing 110 of the connector 100 and spaced from each other by a predetermined angle.

As shown in FIGS. 2-3, a pair of notches 121 are formed in the protruding flange 120, and a pair of recesses 122 are formed in the protruding flange 120. The two notches 121 and the two recesses 122 are alternately arranged on the outer circumferential wall of the housing 110 of the connector 100 and spaced from each other by an angle of about 90 degrees.

Please be noted that the present invention is not limited to the illustrated embodiment, there may be three or more notches and three or more recesses formed in the protruding flange, and the notches and the recesses may be alternately arranged and spaced from each other by different angles on the outer circumferential wall of the housing 110 of the connector 100.

As shown in FIGS. 1-4, in an exemplary embodiment, the pulling device 200 mainly comprises a first body 210 and a second body 201 detachably connected to the first body 210.

The protrusion 221 is formed on an inner wall of the first body 210. The first connection ear portion 202 is formed on the second body 201.

Please be noted that the pulling device 200 is not limited to the illustrate embodiment, the pulling device may comprise only a single member, that is, the pulling device may be configured to be an integral piece.

As shown in FIGS. 1-4, an elongated pulling element (not shown), for example, a rope, is adapted to be directly tied on the first connection ear portion 202 of the pulling device 200.

Figure 5:
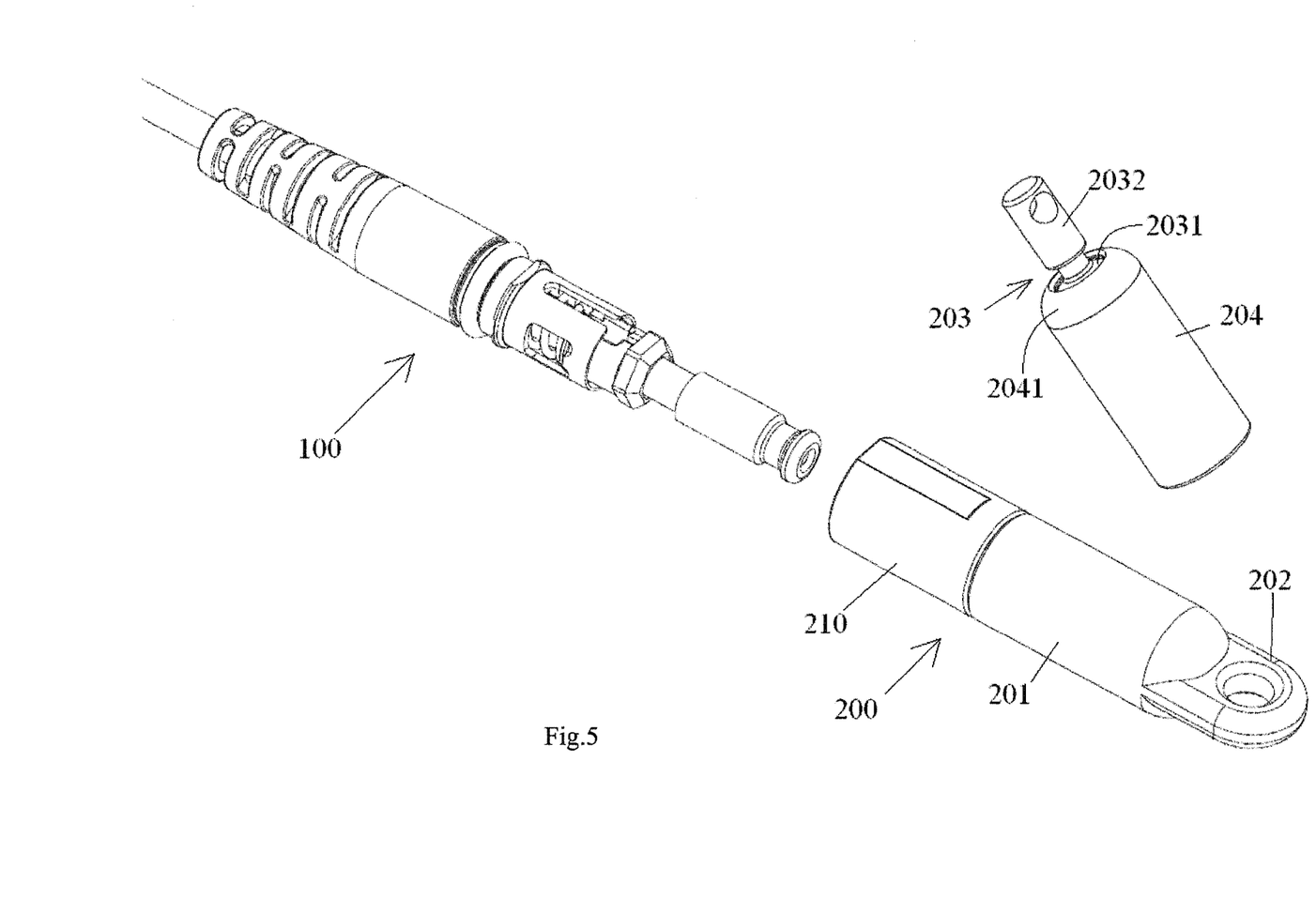
FIG. 5 is an illustrative perspective view of a cable pulling assembly according to a second exemplary embodiment of the present invention.

FIG. 5 is an illustrative perspective view of a cable pulling assembly according to a second exemplary embodiment of the present invention.

On the purpose of concise, hereafter it will only describe the differences of the cable pulling assembly shown in FIG. 5 according to the second embodiment from the cable pulling assembly shown in FIGS. 1-4 according to the first embodiment.

As shown in FIG. 5, in the cable pulling assembly according to the second embodiment, a torsion-proof mechanism is provided, so as to prevent the cable from being twisted and turned during pulling the cable through the pipe by means of the cable pulling assembly.

As shown in FIG. 5, the torsion-proof mechanism mainly comprises a connection member 203 and a rotation sleeve 204. The connection member 203 is formed with a second connection ear portion 2032 at one end thereof and a ball head portion 2031 at the other end thereof. The rotation sleeve 204 is formed with a ball socket 2041 at one end thereof and a connection portion for connecting an elongated pulling element, for example, a metal rope crimped on the connection portion, at the other end thereof. The second connection ear portion 2032 of the connection member 203 is connected to the first connection ear portion 202 of the second body 201. The ball head portion 2031 of the connection member 203 is rotatably engaged in the socket portion 2041 of the rotation sleeve 204, so that the rotation sleeve 204 is rotatable about an axis of the connector 100 and movable from the axis of the connector 100 with respect to the second body 201. In this way, the cable cannot be twisted or turned during pulling the cable through the pipe by means of the cable pulling assembly.

Figure 6:
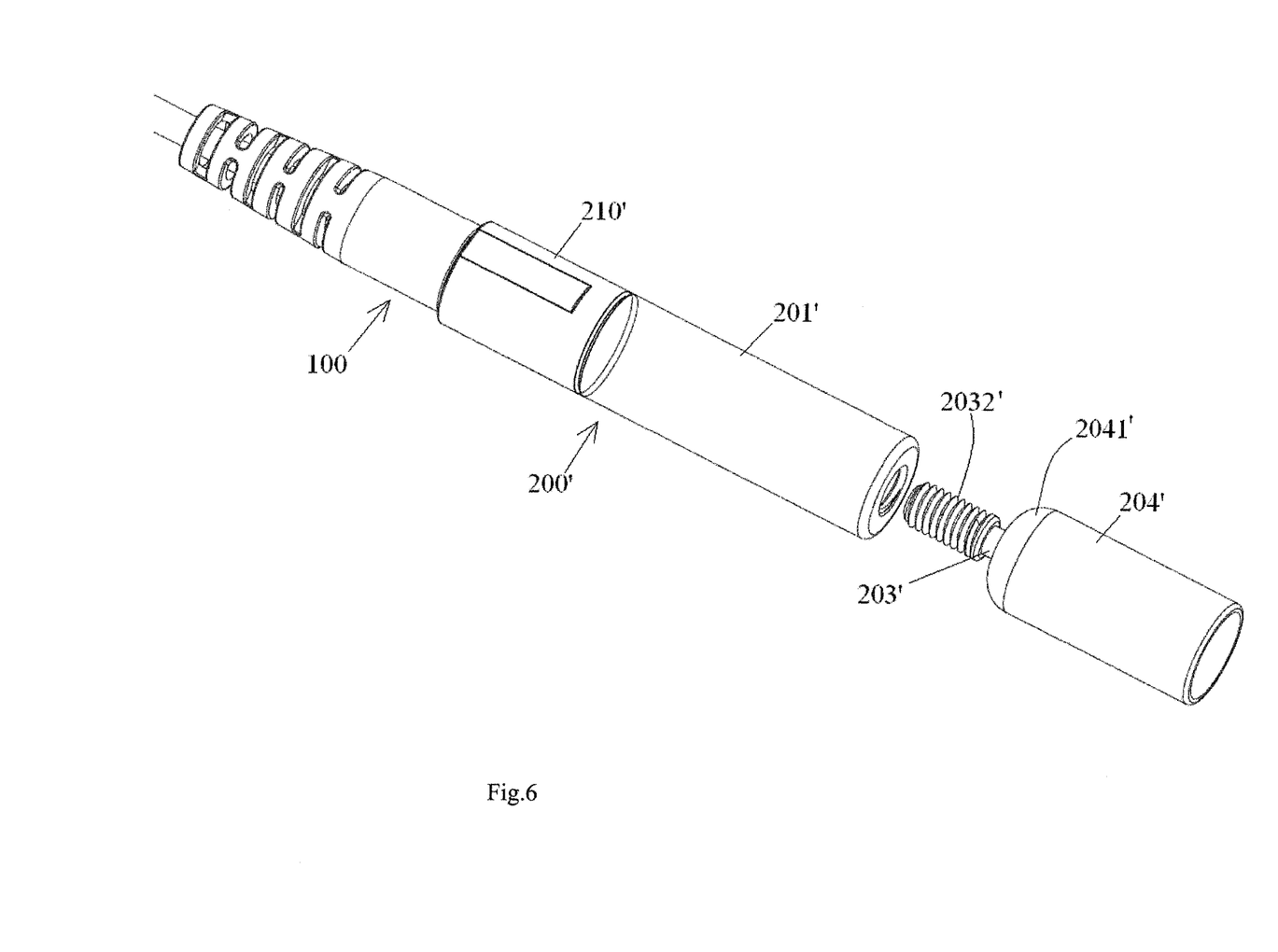
FIG. 6 is an illustrative perspective view of a cable pulling assembly according to a third exemplary embodiment of the present invention.
Figure 7:
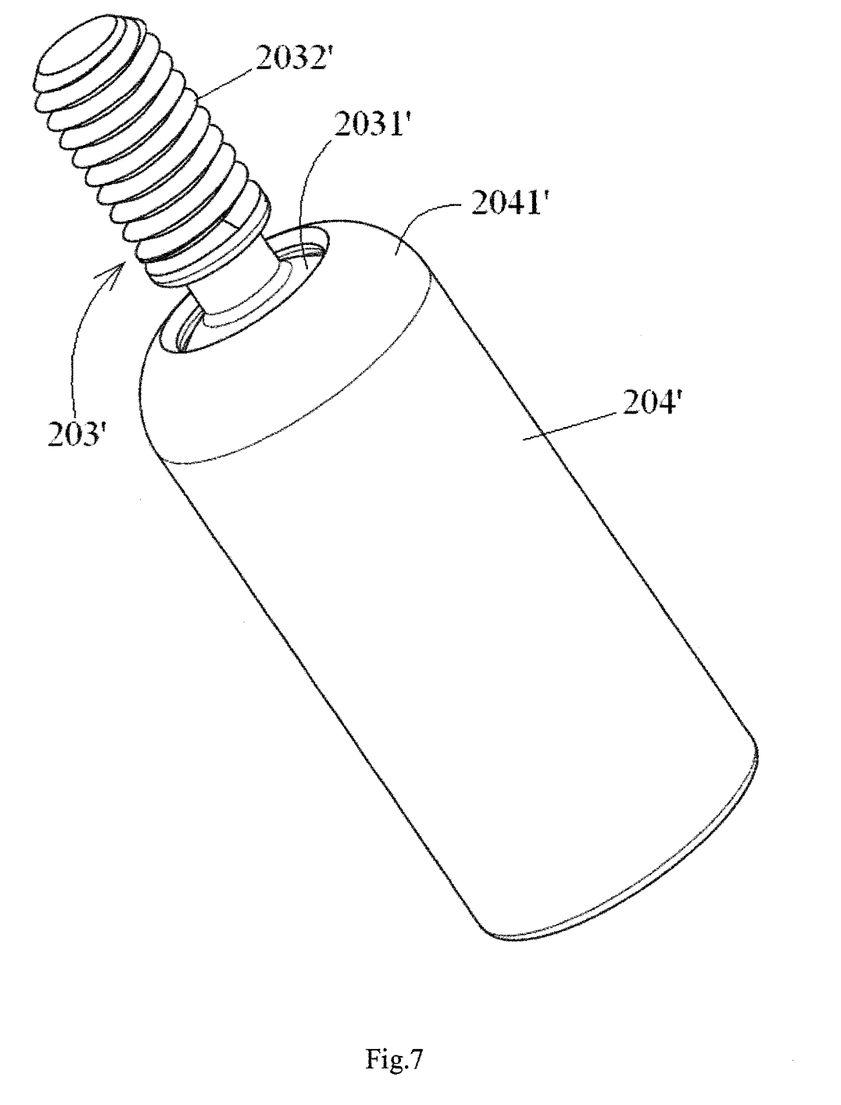
FIG. 7 is an illustrative enlarged view of a connection member and a rotation sleeve in FIG. 6.

FIG. 6 is an illustrative perspective view of a cable pulling assembly according to a third exemplary embodiment of the present invention; and FIG. 7 is an illustrative enlarged view of a connection member and a rotation sleeve in FIG. 6.

On the purpose of concise, hereafter it will only describe the differences of the cable pulling assembly shown in FIGS. 6-7 according to the third embodiment from the cable pulling assembly shown in FIG. 5 according to the second embodiment.

As shown in FIGS. 6-7, in the cable pulling assembly according to the third embodiment, the pulling device 200' mainly comprises a first body 210', a second body 201', a connection member 203' and a rotation sleeve 204'. The protrusion 221 used as the first engagement portion is formed on an inner wall of the first body 210'. One end of the second body 201' is removably connected to the first body 210', and the other end of the second body 201' is formed with a threaded hole. One end of the connection member 203' is formed with a threaded post 2032', and the other end of the connection member 203' is formed with a ball head portion 2031'. One end of the rotation sleeve 204' is formed with a socket portion 2041', and the other end of the rotation sleeve 204' is adapted be connected to an elongated pulling element (not shown), for example, a rope.

As shown in FIGS. 6-7, the threaded post 2032' of the connection member 203' is screwed into the threaded hole of the second body 201', and the ball head portion 2031' of the connection member 203' is rotatably engaged in the socket portion 2041' of the rotation sleeve 204', so that the rotation sleeve 204' is rotatable about an axis of the connector 100 and movable from the axis of the connector 100 with respect to the second body 201'. In this way, it can prevent the cable from being twisted and turned during pulling the cable through the pipe by means of the cable pulling assembly.

Hereafter, it will describe in detail a method of assembling the cable pulling assembly with reference to FIGS. 2-4, in an exemplary embodiment, the method mainly comprises steps of:

S110: aligning the protrusion 221 on the pulling device 200 with the notch 121 in the housing 110 of the connector 100, so that the protrusion 221 can pass through the notch 121, and inserting the connector 100 into the pulling device 200; and S120: rotating the pulling device 200 by a predetermined angle with respect to the connector housing 110, so that the protrusion 221 on the pulling device 200 is aligned with and engaged in the recess 122 in the connector housing 110.

Hereafter, it will describe in detail a method of disassembling the cable pulling assembly with reference to FIGS. 2-4, in an exemplary embodiment, the method mainly comprises steps of:

S210: moving the pulling device 200 to compress the spring 103, so that the protrusion 221 on the pulling device 200 is disengaged from the recess 122 in the connector housing 110; and S220: rotating the pulling device 200 by a predetermined angle with respect to the connector housing 110, so that the protrusion 221 on the pulling device 200 is aligned with the notch 121 in the connector housing 110, and pulling the connector 100 out of the pulling device 200.

In the above exemplary embodiments of the present invention, the pulling device 200 can be simply and quickly assembled to and disassembled from the connector housing 110 in the field.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable pulling assembly, comprising:
   a fiber optic connector connected to an end of a cable and comprising a ferrule assembly; and
   a pulling device connected to a housing of the connector,
   wherein an inner wall of the pulling device comprises a first engagement portion,
   wherein an outer wall of the housing of the connector comprises a second engagement portion adapted to be engaged with the first engagement portion,
   wherein when the pulling device is sleeved on the housing of the connector and when the first and second engagement portions are engaged with each other, the pulling device is connected to the housing of the connector;
   wherein the housing of the connector houses a spring, the spring exerting an elastic force on the ferrule assembly; and
   wherein when the pulling device is connected to the housing of the connector, the spring exerts an axial pushing force on the pulling device.

2. The cable pulling assembly according to claim 1,
   wherein the first engagement portion is one of a protrusion and a recess, and the second engagement portion is the other of the protrusion and the recess; and
   wherein when the pulling device is connected to the housing of the connector, the axial pushing force of the spring on the pulling device holds the protrusion in the recess.

3. The cable pulling assembly according to claim 1,
   wherein the first engagement portion is a protrusion on the inner wall of the pulling device, and the second engagement portion is a recess formed in the outer wall of the housing of the connector; and
   wherein when the pulling device is connected to the housing of the connector, the axial pushing force of the spring on the pulling device holds the protrusion in the recess.

4. The cable pulling assembly according to claim 3,
   wherein an engagement between the protrusion and the recess is released by compressing the spring against the axial pushing force with the pulling device.

5. The cable pulling assembly according to claim 4,
   wherein a first end of the pulling device has an opening through which the connector is insertable, and another end of the pulling device is sealed;
   wherein a seal ring is mounted on the housing of the connector; and
   wherein when the pulling device is connected to the housing of the connector, an edge of the opening of the pulling device compresses against the seal ring to seal an interface between the pulling device and the connector.

6. The cable pulling assembly according to claim 5,
   wherein a dust cap is mounted on a front end of a ferrule of the ferrule assembly, and
   wherein when the pulling device is connected to the housing of the connector, the dust cap directly abuts the sealed end of the pulling device under an action of the spring.

7. The cable pulling assembly according to claim 3,
   wherein the outer wall of the housing of the fiber optic connector includes a protruding flange adapted to be engaged with a groove of a fiber optic adapter, the protruding flange including a notch adapted to allow the protrusion of the pulling device to pass therethrough; and
   wherein the recess is disposed in one side of the protruding flange opposite to a front end of the connector.

8. The cable pulling assembly according to claim 7,
   wherein a plurality of notches are disposed in the protruding flange, and a plurality of recesses are disposed in the protruding flange; and
   wherein the notches and the recesses are alternately arranged and spaced from each other by a predetermined angle on an outer circumferential wall of the housing of the connector.

9. The cable pulling assembly according to claim 8,
   wherein a pair of notches are disposed in the protruding flange, and a pair of recesses are disposed in the protruding flange; and
   wherein the notches and the recesses are alternately arranged and spaced from each other by an angle of 90 degrees on the outer circumferential wall of the housing of the connector.

10. The cable pulling assembly according to claim 9, wherein the pulling device is an integral piece.

11. The cable pulling assembly according to claim 9, wherein the pulling device comprises:
    a first body, on an inner wall of which the protrusion is disposed; and
    a second body removably connected to the first body and having a first connection ear portion.

12. The cable pulling assembly according to claim 11,
    wherein an elongated pulling element is adapted to be directly tied on the first connection ear portion.

13. The cable pulling assembly according to claim 11,
    wherein the pulling device further comprises:
    a connection member having a second connection ear portion at one end thereof and a ball head portion at the other end thereof; and
    a rotation sleeve having a ball socket at a first end thereof and a connection portion for connecting an elongated pulling element at a second end thereof that is opposite the first end,
    wherein the second connection ear portion of the connection member is connected to the first connection ear portion of the second body, and
    wherein the ball head portion of the connection member is rotatably engaged in the socket portion of the rotation sleeve, so that the rotation sleeve is rotatable about an axis of the connector and movable from the axis of the connector with respect to the second body.

14. The cable pulling assembly according to claim 13,
    wherein the elongated pulling element is crimped on the second end of the rotation sleeve.

15. The cable pulling assembly according to claim 9, wherein the pulling device comprises:
    a first body, on an inner wall of which the protrusion is disposed;
    a second body, a first end of which is removably connected to the first body, and an opposing second end of which includes a threaded hole;
    a connection member, a first end of which includes a threaded post, and an opposing second end of which includes a ball head portion; and
    a rotation sleeve, a first end of which includes a socket portion, and an opposing second end of which is adapted be connected to an elongated pulling element,
    wherein the threaded post of the connection member is screwed into the threaded hole of the second body, and
    wherein the ball head portion of the connection member is rotatably engaged in the socket portion of the rotation sleeve, so that the rotation sleeve is rotatable about an axis of the connector and movable from the axis of the connector with respect to the second body.

16. The cable pulling assembly according to claim 15, wherein the elongated pulling element is crimped on the second end of the rotation sleeve.

* * * * *